United States Patent
Bentley et al.

(10) Patent No.: US 8,499,133 B2
(45) Date of Patent: *Jul. 30, 2013

(54) CACHE MANAGEMENT FOR INCREASING PERFORMANCE OF HIGH-AVAILABILITY MULTI-CORE SYSTEMS

(71) Applicant: Avaya Inc., Basking Ridge, NJ (US)

(72) Inventors: Jon Louis Bentley, New Providence, NJ (US); Frank John Boyle, Denver, CO (US); Anjur Sundaresan Krishnakumar, Princeton, NJ (US); Parameshwaran Krishnan, Basking Ridge, NJ (US); John H. Meiners, Boulder, CO (US); Navjot Singh, Denville, NJ (US); Shalini Yajnik, Berkeley Heights, NJ (US)

(73) Assignee: Avaya Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/674,219

(22) Filed: Nov. 12, 2012

(65) Prior Publication Data

US 2013/0103910 A1    Apr. 25, 2013

Related U.S. Application Data

(63) Continuation of application No. 12/570,990, filed on Sep. 30, 2009, now Pat. No. 8,312,239.

(51) Int. Cl.
 *G06F 12/00* (2006.01)
(52) U.S. Cl.
 USPC .......................................... 711/165; 711/162
(58) Field of Classification Search
 USPC .................................................. 711/165, 162
 See application file for complete search history.

(56) References Cited

U.S. PATENT DOCUMENTS

| 5,619,696 | A  | * | 4/1997 | Nakagawa | .................... 718/100 |
| 7,277,997 | B2 | * | 10/2007 | Vincent | ........................ 711/162 |
| 2009/0248984 | A1 | * | 10/2009 | Shen et al. | ..................... 711/122 |

* cited by examiner

*Primary Examiner* — Hashem Farrokh
(74) *Attorney, Agent, or Firm* — Maldjian Law Group LLC; John P. Maldjian, Esq.; Alexander D. Walter, Esq.

(57) ABSTRACT

An apparatus and method for improving performance in high-availability systems are disclosed. In accordance with the illustrative embodiment, pages of memory of a primary system that are to be shadowed are initially copied to a backup system's memory, as well as to a cache in the primary system. A duplication manager process maintains the cache in an intelligent manner that significantly reduces the overhead required to keep the backup system in sync with the primary system, as well as the cache size needed to achieve a given level of performance. Advantageously, the duplication manager is executed on a different processor core than the application process executing transactions, further improving performance.

7 Claims, 3 Drawing Sheets

CACHE MANAGEMENT FOR INCREASING PERFORMANCE OF HIGH-AVAILABILITY MULTI-CORE SYSTEMS

CROSS-REFERENCE TO RELATED APPLICATIONS

This application is a continuation patent application of U.S. patent application Ser. No. 12/570,990, filed Sep. 30, 2009, entitled "CACHE MANAGEMENT FOR INCREASING PERFORMANCE OF HIGH-AVAILABILITY MULTI-CORE SYSTEMS," the content of which is hereby incorporated by reference in its entirety.

BACKGROUND

1. Field of the Invention

The present invention relates to high-availability systems in general, and, more particularly, to a technique for improving performance in high-availability systems.

2. Description of Related Art

A common strategy for achieving high availability and fault tolerance in data-processing systems is to employ a primary system and a backup system (or a plurality of backup systems), and to duplicate (or shadow) the primary system's state onto the backup machine(s), thereby enabling near-seamless failover to the backup if the primary fails. Unfortunately, the additional overhead required to maintain a backup system and keep its state in synch with the primary system can significantly degrade performance. What is needed, therefore, is a technique for improving performance in high-availability systems.

SUMMARY

The present invention employs a novel cache management technique for improving performance in high-availability systems. In accordance with the illustrative embodiment, pages of memory of a primary system that are to be shadowed are initially copied to a backup system's memory, as well as to a cache in the primary system. When a transaction is executed on the primary system that "dirties" a page of memory—i.e., the page was updated (written to) during the transaction, potentially (but not necessarily) changing the page's contents—a duplication manager process stores the updated page in the cache, without overwriting the previous version. The duplication manager process then suspends the process that executed the transaction, computes the difference between the updated page and the previous version, and re-starts the suspended process.

Next, the duplication manager process transmits the smaller of the difference and the updated page (i.e., the one that requires fewer bits to represent) to the backup system, and updates a pointer to the cache so that it points to the updated version of the page. A process on the backup system then updates the copy of the page in the backup's memory, based on the data received from the duplication manager process.

Advantageously, in accordance with the illustrative embodiment the primary system employs a multi-core processor, and the duplication manager process is executed on a different processor core than the application process (i.e., the process that executes the transaction), thereby reducing the overhead incurred in maintaining the backup system. Further advantageously, when another transaction that dirties the page of memory is subsequently executed, the contents of the page prior to the transaction is not copied to the cache, because the pre-transaction contents of the page is already present in the cache, referenced by the pointer. This technique dramatically reduces the overhead involved in keeping the backup system in sync with the primary system, and also reduces the cache size needed to achieve a given level of performance. The other tasks of the duplication manager (e.g., computing the difference, etc.) are performed for the new transaction, as well as for any subsequent transaction.

The illustrative embodiment comprises: a first memory; a second memory; a cache; and a first processor for: executing a transaction; copying a page of the first memory to the second memory and to the cache prior to the execution of the transaction; detecting that the contents of the page in the first memory was changed by the transaction; copying the updated contents of the page to the cache, without overwriting in the cache the contents of the page prior to the transaction; computing a difference between the post-transaction and pre-transaction contents of the page based on the contents of the cache; transmitting the smaller of the difference and the post-transaction contents to a second processor; and updating a pointer to the cache so that it points to the post-transaction contents of the page instead of the pre-transaction contents of the page.

DETAILED DESCRIPTION

For the purposes of this specification, the term "process" is defined as a program in execution, and includes lightweight processes known in the art as threads.

For the purposes of this specification, the term "page" is defined as a fixed number of bytes of memory, and applies to virtual memory as well as physical memory.

Figure 1:
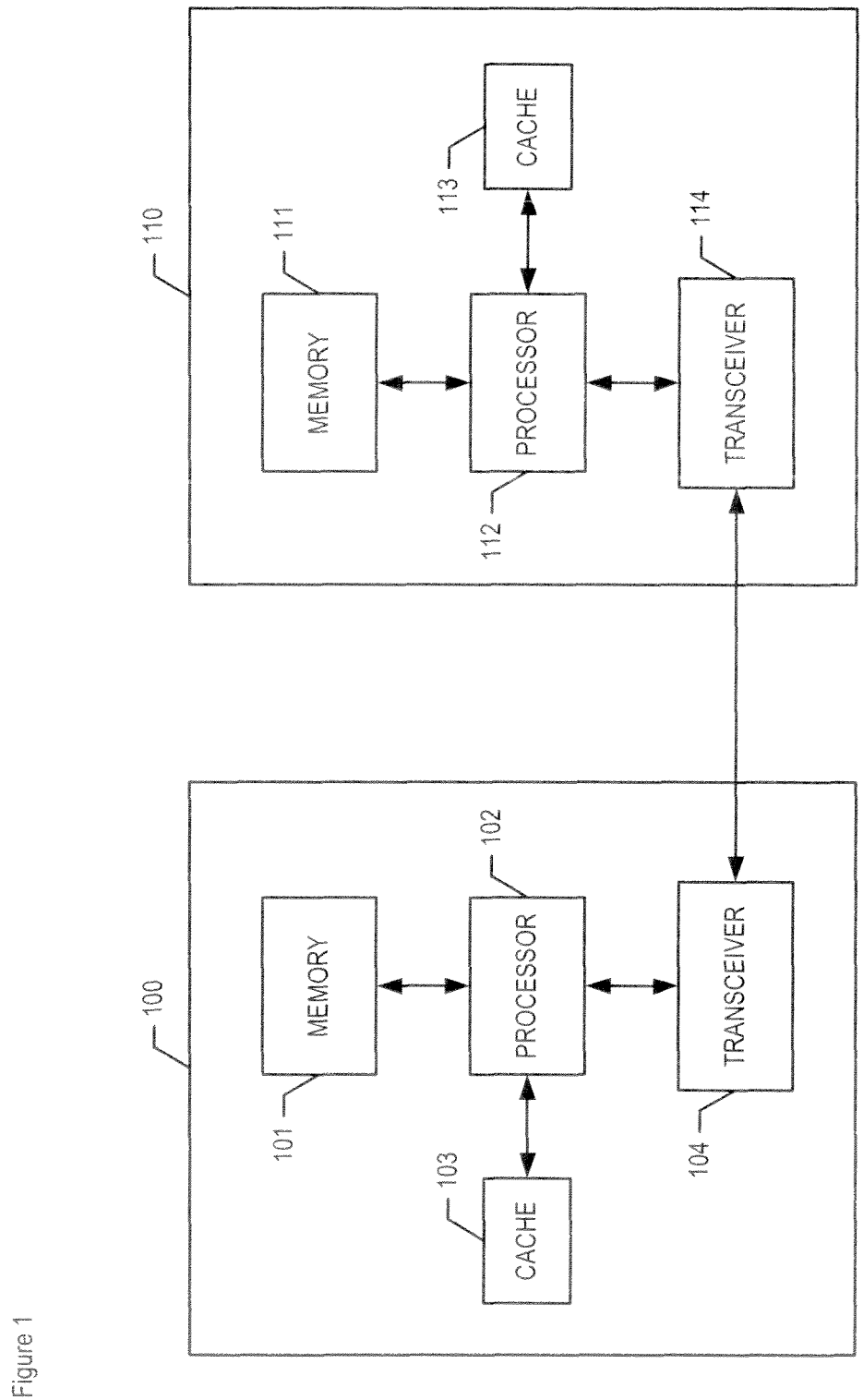
FIG. 1 depicts a block diagram of the salient elements of a primary and a backup data-processing system, in accordance with the illustrative embodiment of the present invention.

FIG. 1 depicts a block diagram of the salient elements of primary data-processing system 100 and backup data-processing system 110, in accordance with the illustrative embodiment of the present invention.

Primary data-processing system 100 is one of a server, a switch, a router, etc. and comprises memory 101, processor 102, cache 103, and transceiver 104, interconnected as shown.

Memory 101 is capable of storing data and executable instructions, as is well-known in the art, and might be any combination of random-access memory (RAM), flash memory, etc.

Processor 102 is a general-purpose processor that is capable of executing instructions stored in memory 101, of reading data from and writing data into memory 101, of reading data from and writing data into cache 103, described below, of receiving and transmitting information via transceiver 104, and of executing the pertinent tasks described below and with respect to FIGS. 2 and 3. In accordance with the illustrative embodiment, processor 102 is a multi-core processor that is capable of running a first process in a first core and a second process in a second core simultaneously. As will be appreciated by those skilled in the art, in some alternative embodiments of the present invention, processor 112 might be a single-core processor, or might be a special-purpose processor (e.g., a network processor, an applications, processor, etc.), and it will be clear to those skilled in the art, after reading this disclosure, how to make and use such embodiments of the present invention.

Cache 103 is a high-speed memory that enables rapid storage and retrieval of data, as is well-known in the art.

Transceiver 104 is capable of receiving signals (e.g., via a local-area network, etc.) and forwarding information encoded in the signals to processor 102, in well-known fashion, and of receiving information from processor 102 and transmitting signals that encode the information (e.g., via a local-area network, etc.), in well-known fashion.

Backup data-processing system 110 is one of a server, a switch, a router, etc. and comprises memory 111, processor 112, cache 113, and transceiver 114, interconnected as shown.

Memory 111 is capable of storing data and executable instructions, as is well-known in the art, and might be any combination of random-access memory (RAM), flash memory, etc.

Processor 112 is a general-purpose processor that is capable of executing instructions stored in memory 111, of reading data from and writing data into memory 111, of reading data from and writing data into cache 113, described below, of receiving and transmitting information via transceiver 114, and of executing the pertinent tasks described below and with respect to FIGS. 2 and 3. In accordance with the illustrative embodiment, processor 112 is a multi-core processor that is capable of running a first process in a first core and a second process in a second core simultaneously. As will be appreciated by those skilled in the art, in some alternative embodiments of the present invention, processor 112 might be a single-core processor, or might be a special-purpose processor (e.g., a network processor, an applications, processor, etc.), and it will be clear to those skilled in the art, after reading this disclosure, how to make and use such embodiments of the present invention.

Cache 113 is a high-speed memory that enables rapid storage and retrieval of data, as is well-known in the art.

Transceiver 114 is capable of receiving signals (e.g., via a local-area network, etc.) and forwarding information encoded in the signals to processor 112, in well-known fashion, and of receiving information from processor 112 and transmitting signals that encode the information (e.g., via a local-area network, etc.), in well-known fashion.

In accordance with the illustrative embodiment, primary data-processing system 100 and backup data-processing system 110 are identical machines in both hardware and software, which provides the advantage of enabling backup data-processing system 110 to backup to another machine not depicted in FIG. 1, or perhaps to data-processing system 100 after system 100 has recovered (i.e., backup data-processing system 110 has the capability of becoming a primary machine itself). As will be appreciated by those skilled in the art, in some other embodiments systems 100 and 110 might not be identical in either hardware, software, or both, and it will be clear to those skilled in the art, after reading this disclosure, how to make and use such embodiments of the present invention. As will yet further be appreciated by those skilled in the art, some other embodiments of the present invention might employ a plurality of backup data-processing systems, and it will be clear to those skilled in the art, after reading this disclosure, how to make and use such embodiments of the present invention.

Figure 2:
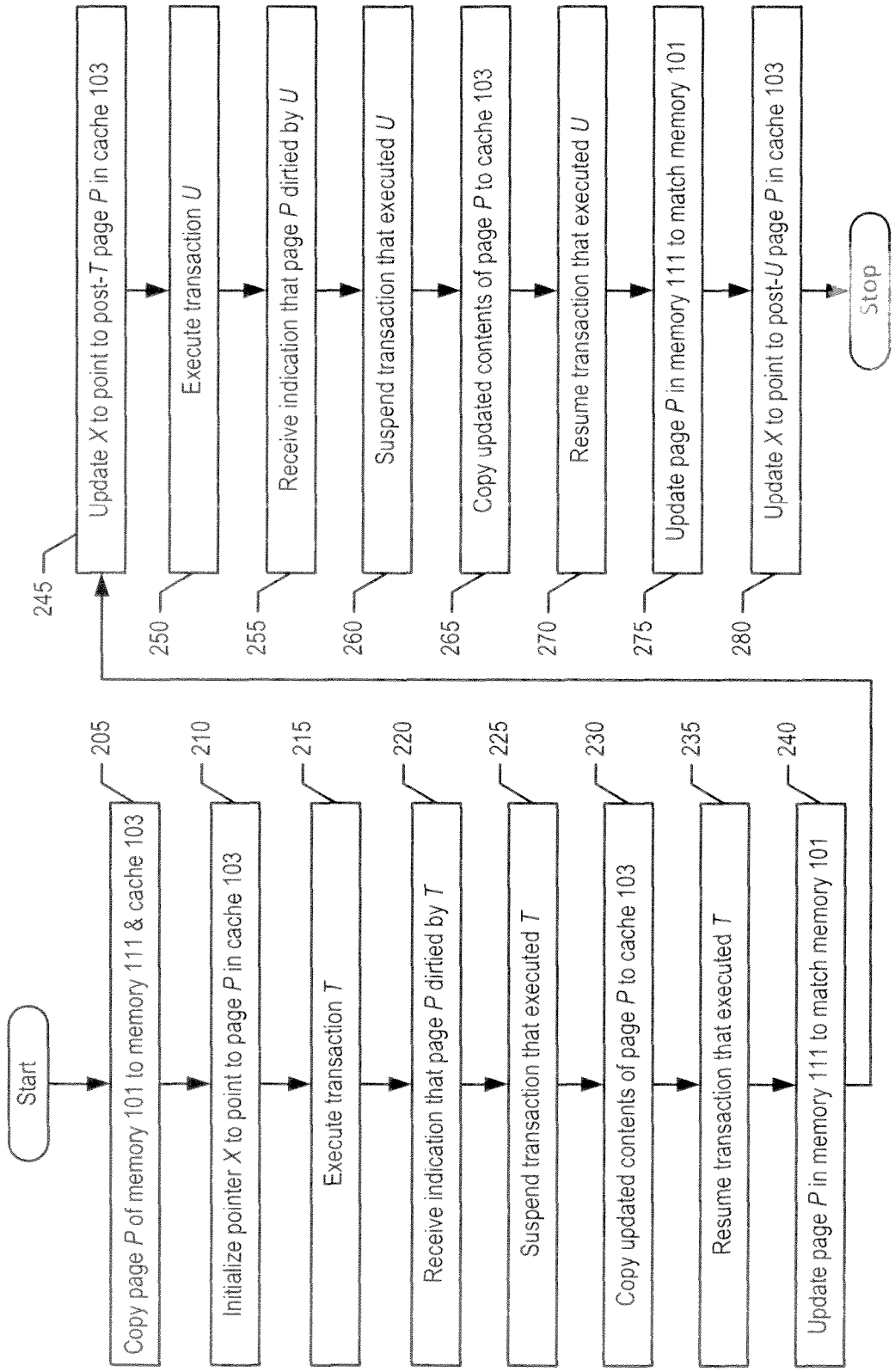
FIG. 2 depicts the salient tasks of a method for maintaining high availability of processes and applications executing on data-processing system 100, as shown in FIG. 1, in accordance with the illustrative embodiment of the present invention.

FIG. 2 depicts the salient tasks of a method for maintaining high availability of processes and applications executing on data-processing system 100, in accordance with the illustrative embodiment of the present invention. As will be appreciated by those skilled in the art, the method of FIG. 2 is described in the context of data-processing system 100 acting as the primary machine and data-processing system 110 acting as the backup machine, but, as described above, the method can also be employed in when data-processing system 110 is the primary machine and data-processing system 100, or some other system not depicted in FIG. 1, is the backup machine. Moreover, it will be clear to those skilled in the art, after reading this disclosure, which tasks depicted in FIG. 2 can be performed simultaneously or in a different order than that depicted.

At task 205, a page P of memory 101 that is to be shadowed is copied to memory 111 and to cache 103. In accordance with the illustrative embodiment, a duplication manager process (referred to subsequently as process D) executing on a first core of processor 102 reads the contents of page P, copies page P into cache 103, and transmits page P to processor 112 via transceiver 104 and transceiver 114, and a process executing on processor 112 (referred to subsequently as process E) writes the contents of page P to memory 111. As will be appreciated by those skilled in the art, in some other embodiments task 210 might be performed in a different manner, or by one or more other elements of data-processing systems 100 and 110, or by one or more other elements not depicted in FIG. 1, and it will be clear to those skilled in the art, after reading this disclosure, how to make and use such embodiments of the present invention. As will further be appreciated by those skilled in the art, in some embodiments of the present invention, all pages of memory 101 might be designated to be shadowed (i.e., a full-memory backup), while in some other embodiments selected pages of memory 101 might be designated to be shadowed.

At task 210, process D initializes a pointer X to point to page P in cache 103, in well-known fashion.

At task 215, a second process that is part of an application and runs on a second core of processor 102 (referred to subsequently as process C) executes a transaction T, in well-known fashion.

At task 220, process D receives an indication that page P was "dirtied" by transaction T—i.e., page P was updated (written to) during transaction T, potentially (but not necessarily) changing page P's contents. As will be appreciated by those skilled in the art, in some embodiments such an indication might be provided by a "dirty bit" of memory 101 that corresponds to page P, while in some other embodiments this indication might be provided in some other fashion (e.g., by an operating system executing on processor 102, etc.).

At task 225, process D suspends process C, in well-known fashion.

At task 230, process D copies the updated contents of page P to cache 103, without overwriting in cache 103 the prior contents of page P (i.e., the updated contents are written to a different area of cache 103 so that both the pre-transaction and post-transaction contents of page P are stored in cache 103).

At task 235, process D transmits a signal that causes process C to resume execution, in well-known fashion.

At task 240, process D updates the contents of page P in memory 111 to match the updated contents of page P in memory 101. Task 240 is described in detail below and with respect to FIG. 3.

At task 245, process D updates pointer X so that it points to the post-transaction page P in cache 103 instead of the pre-transaction page P, in well-known fashion. In accordance with the illustrative embodiment, the portion of cache 103 occupied by pre-transaction page P is freed for storing other data (e.g., the contents of page P after a subsequent transaction, the contents of some other page of memory 101, etc.).

At task 250, a process Q executes a transaction U, wherein process Q is either the same as process C, or is a process other than process C and process D that executes on processor 102 (i.e., Q is a variable that might equal C or might equal an identifier of some other process).

At task 255, process D receives an indication that page P was "dirtied" by transaction U.

At task 260, process D suspends process Q, in well-known fashion.

At task 265, process D copies the updated contents of page P to cache 103, without overwriting in cache 103 the prior contents of page P (i.e., the updated contents are written to a different area of cache 103 so that both the post-transaction-U contents of page P and the pre-transaction-U/post-transaction-T contents of page P are stored in cache 103).

At task 270, process D transmits a signal that causes process Q to resume execution, in well-known fashion.

At task 275, process D updates the contents of page P in memory 111 to match the updated contents of page P in memory 101. Task 275 is performed in the same manner as task 240, which is described in detail below and with respect to FIG. 3.

At task 280, process D updates pointer X so that it points to the post-transaction-U page P in cache 103 instead of the pre-transaction-U/post-transaction-T page P, in well-known fashion. In accordance with the illustrative embodiment, the portion of cache 103 occupied by pre-transaction-U/post-transaction-T page P is freed for storing other data (e.g., the contents of page P after a subsequent transaction, the contents of some other page of memory 101, etc.).

After task 280, the method of FIG. 2 terminates.

Figure 3:
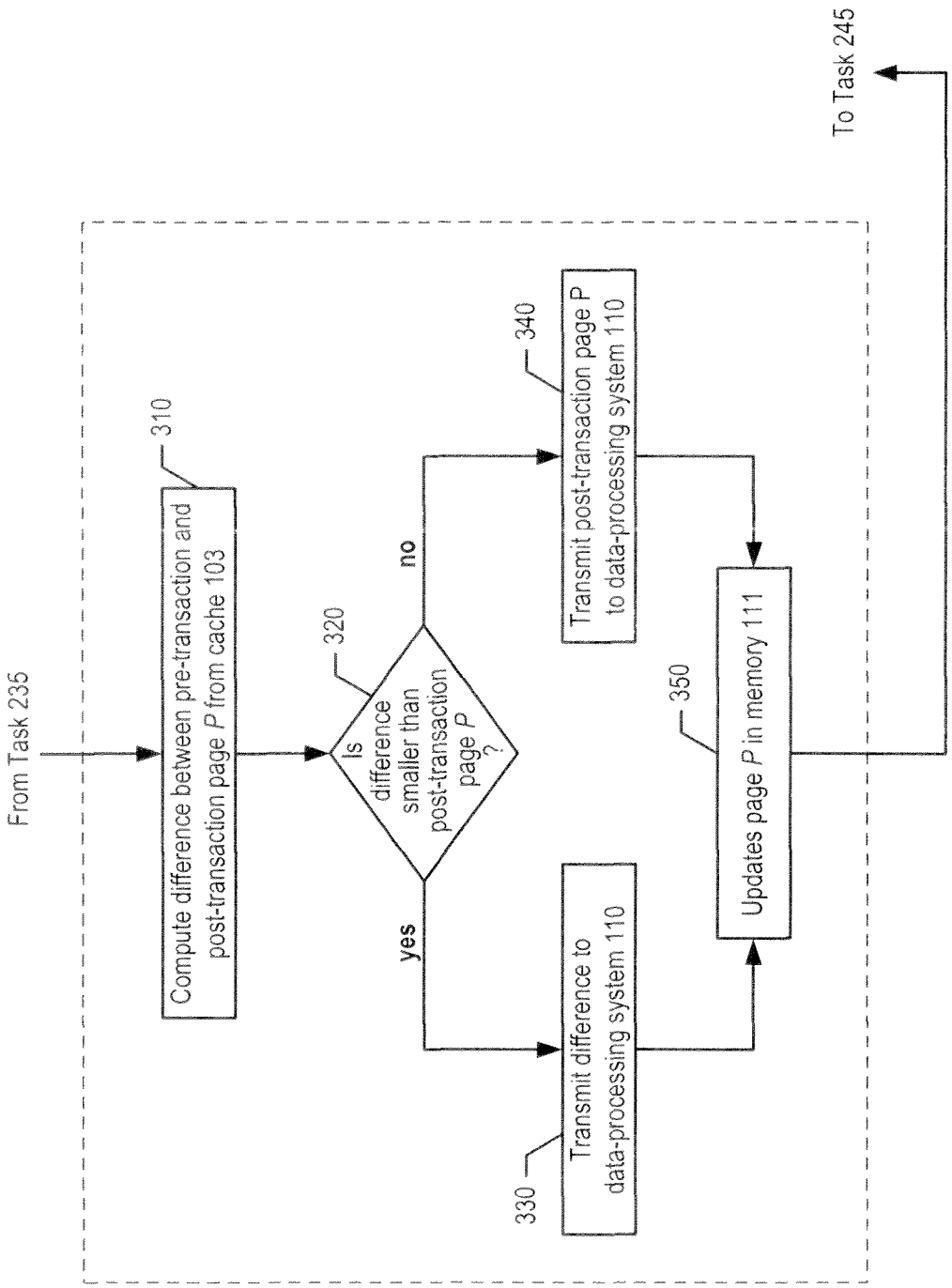
FIG. 3 depicts a detailed flowchart of task 240, as shown in FIG. 2, in accordance with the illustrative embodiment of the present invention.

FIG. 3 depicts a detailed flowchart of task 240, in accordance with the illustrative embodiment of the present invention.

At subtask 310, process D computes a difference between pre-transaction and post-transaction page P based on the contents in cache 103, in well-known fashion.

At subtask 320, process D checks whether the difference computed at subtask 310 is smaller in size (i.e., requires fewer bits to represent) than post-transaction page P. If so, execution continues at subtask 330, otherwise execution continues at subtask 340.

At subtask 330, process D transmits the difference computed at subtask 310, via transceiver 104 and transceiver 114, to process E executing on processor 112, in well-known fashion. After subtask 330, execution continues at subtask 350.

At subtask 340, process D transmits post-transaction page P, via transceiver 104 and transceiver 114, to process E executing on processor 112, in well-known fashion.

At subtask 350, process E updates page P in memory 111 based on the data received at either subtask 330 or subtask 350, in well-known fashion.

After subtask 350 has been executed, task 240 is complete and execution of the method of FIG. 2 continues at task 245.

Could be one data-processing system, one processor with two memories, process D and E same, blah It is to be understood that the disclosure teaches just one example of the illustrative embodiment and that many variations of the invention can easily be devised by those skilled in the art after reading this disclosure and that the scope of the present invention is to be determined by the following claims.

The invention claimed is:

1. A method comprising:
    (a) copying a page of a first memory to a second memory and to a cache prior to a transaction that is executed by a first process;
    (b) when contents of said page are updated by said transaction:
        (i) suspending said first process;
        (ii) copying, via a second process, the updated contents of said page to said cache, without overwriting in said cache the contents of said page prior to said transaction;
        (iii) resuming execution of said first process after the copying of the updated contents of said page to said cache; and
        (iv) updating the contents of said page in said second memory to match the updated contents of said page in said first memory.

2. The method of claim 1 further comprising, when contents of said page are updated by said transaction:
    (v) updating a pointer to said cache so that it points to the contents of said page after said transaction instead of the contents of said page prior to said transaction.

3. The method of claim 2 wherein the updating of said pointer to said cache is done by said second process.

4. The method of claim 1 wherein the suspension of said first process is done by said second process.

5. The method of claim 1 wherein said first memory, said first process, and said second process belong to a first data-processing system, and wherein said second memory belongs to a second data-processing system.

6. The method of claim 5 wherein the updating of the contents of said page in said second memory is done by a third process that belongs to said second data-processing system.

7. The method of claim 6 wherein the updating of the contents of said page in said second memory comprises:
    computing a difference between the post-transaction and pre-transaction contents of said page based on the contents of said cache, and
    transmitting the smaller of said difference and said post-transaction contents to said third process.

\* \* \* \* \*